United States Patent [19]

Wingrave

[11] 4,112,206
[45] Sep. 5, 1978

[54] POLYVINYL CHLORIDE HAVING IMPROVED ANTISTATIC PROPERTIES

[75] Inventor: James A. Wingrave, Ponca City, Okla.

[73] Assignee: Continental Oil Company, Ponca City, Okla.

[21] Appl. No.: 812,555

[22] Filed: Jul. 5, 1977

[51] Int. Cl.² ............................................. C08F 6/00
[52] U.S. Cl. .............................. 526/3; 260/DIG. 15; 260/DIG. 21; 526/1
[58] Field of Search ............... 526/3, 1; 260/29.6 SQ, 260/29.6 MQ, 45.7 S, 45.95, DIG. 15, DIG. 21, DIG. 17

[56] References Cited

U.S. PATENT DOCUMENTS

| | | | |
|---|---|---|---|
| 3,766,106 | 10/1973 | Yurimoto | 260/17 A |
| 3,849,242 | 11/1974 | Takeya | 260/DIG. 17 |
| 3,895,000 | 7/1975 | Mathieu | 526/216 |
| 3,980,715 | 9/1976 | Szur | 260/615 F |

OTHER PUBLICATIONS

Fluorad Bulletin, Minnesota Mining & Manufacturing Co. (Comm. Chem. Div.).
Monflor Bulletin, Imperial Chemical Industries, Ltd.

*Primary Examiner*—Christopher A. Henderson, Jr.
*Attorney, Agent, or Firm*—Bayless E. Rutherford, Jr.

[57] ABSTRACT

Polyvinyl chloride containing certain fluorocarbon surfactants has improved antistatic properties. The fluorocarbon surfactants are fluorinated alkyl polyoxyethylene ethanols and a compound represented by the formula

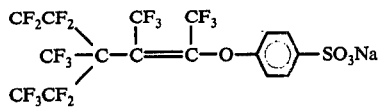

5 Claims, No Drawings

POLYVINYL CHLORIDE HAVING IMPROVED ANTISTATIC PROPERTIES

FIELD OF THE INVENTION

The invention is in the general field of polyvinyl chloride compositions having improved antistatic properties.

GENERAL BACKGROUND

It is well-known that polyvinyl chloride products and articles may accumulate static electricity charges under certain conditions. Friction against, and separation after surface contact with, other surfaces are common ways of charge generation. Since surface charges leak away more easily in moist conditions, the highest and most persistent charges result at lowest relative humidities. Charge build-up is drastically reduced at relative humidities above about 80%.

It is thus apparent that static electricity in polyvinyl chloride is a problem, which can be serious and even dangerous. The problem of preventing static electricity charge build-up is polyvinyl chloride can be solved by two general methods: chemical treatment and physical treatment.

My invention is directed to solving the problem by chemical treatment using certain specific fluorocarbon compounds.

PRIOR ART STATEMENT

My invention uses certain commercially available fluorocarbon surfactant compounds. Brochures are available describing these specific compounds. The brochures do not suggest that these specific compounds would be useful as antistatic agents in polyvinyl chloride. Chemically related compounds are known to be useful as antistatic agents for polyethylene. However, it is believed to be recognized that there is no correlation between antistatic agents for polyethylene and for polyvinyl chloride. In other words a material which is effective as an antistatic agent for polyethylene could not be predicted as being effective as an antistatic agent for polyvinyl chloride.

A search of the prior art did not find any reference teaching the compounds of my invention as anti-static agents in polyvinyl chloride or polyethylene.

BRIEF SUMMARY OF THE INVENTION

Briefly stated, the present invention is directed to polyvinyl chloride having improved antistatic properties, said polyvinyl chloride containing an effective amount of a fluorocarbon surfactant selected from the group consisting of (a) fluorinated alkyl polyoxyethylene ethanols, and (b) a compound represented by the formula

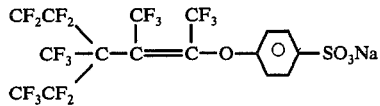

In one aspect the invention is directed to a method of preparing a polyvinyl chloride having improved anti-static properties wherein the method comprises incorporating in the polyvinyl chloride an effective amount of a fluorocarbon surfactant selected from the group consisting of (a) fluorinated alkyl polyoxyethylene ethanols, and (b) a compound represented by the formula

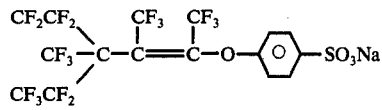

DETAILED DESCRIPTION

My invention is applicable to any commercial polyvinyl chloride.

The following fluorinated compounds are useful in my invention.

A compound represented by the formula

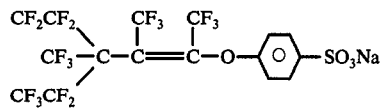

This material is available under the trademark "MONFLOR" 31 from ICI United States, Inc., Specialty Chemicals Division, Wilmington, Delaware.

Fluorinated alkyl polyoxyethylene ethanols represented by the formula

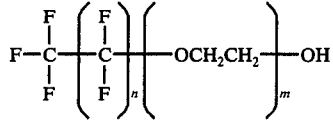

wherein $n$ is in the range of 8 to 18, preferably 12 to 14, and $m$ is in the range of 1 to 5, preferably 2 to 3.

This material is available under the trademark "Fluorad" FC-170 from the 3M Company, Saint Paul, Minnesota.

The amount of fluorinated compounds incorporated in the polyvinyl chloride is shown in the following table, for both suitable and preferred ranges:

| | Suitable | Preferred |
|---|---|---|
| Amount, weight percent based on polyvinyl chloride | 0.0002–0.02 | .0005–.005 |

The manner of addition of the fluorinated compound is not critical. It can be added to the slurry or to the dry polyvinyl chloride.

Additionally, the polyvinyl chloride may contain other conventional additive agents, such as plasticizer, antioxidant, coloring materials, etc.

In order to illustrate the nature of the present invention still more clearly the following examples will be given. It is to be understood, however, that the invention is not to be limited to the specific conditions or details set forth in these examples except insofar as such limitations are specified in the appended claims.

The procedure used was as follows:
1. 100g of resin were weighed into a high shear mixer.
2. A known amount of fluorocarbon surfactant compound was added to the slowly stirring mixer (<300 RPM) in a period <15 seconds.
3. The mixer speed was immediately increased to 10,000 RPM and maintained for 1 minute.

4. The mixed resin was poured into a 1 inch I.D. × 1½ inch cylinder.
5. The cylinder was lifted vertically allowing the mixed resin to flow radially outward into a cone shaped pile.
6. The larger the base of the cone shaped pile of mixed resin and the smoother the surface of the cone the greater the antistatic properties of the fluorocarbon. Using these criteria the antistatic properties were rated by a visual examination. Also, photographs were taken.

Some of the materials tested, the amount used, and the antistatic properties are shown in the following table.

|   |   | Antistatic Property | Amt.** |
|---|---|---|---|
| A - 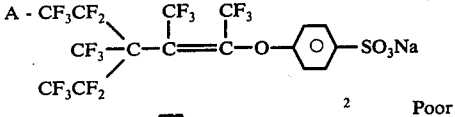 | 1 | Excellent | 0.001 |
| B - $C_{10}F_{19}$—O—⟨O⟩—N—$(C_4H_9)_3$ | 2 | Poor | 0.001 |
| C - $C_{10}F_{19}(OCH_2CH_2)_nOC_{10}F_{19}$ | 3 | Poor | 0.001 |
| D - $C_{10}F_{19}O(CH_2CH_2O)_nCH_3$ | 4 | Poor | 0.001 + 0.002 |
| E - $C_{10}F_{19}(OCH_2CH_2)_nC_{18}H_{37}$ | 5 | Poor | 0.001 |
| F - 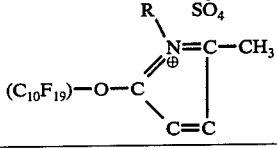 | 6 | Poor | 0.001 |

[1]"Monfluor" 31*
[2]"Monfluor" 32*
[3]"Monfluor" 51*
[4]"Monfluor" 52*
[5]"Monfluor" 53*
[6]"Monfluor" 72*
*Available from ICI U.S., Inc.
**parts per hundred parts of PVC resin Other materials tested, the amounts used, and the antistatic properties are shown in the following table.

|   | Antistatic Property | Amt.** |
|---|---|---|
| G - Potassium perfluoroalkyl sulfonates[7] | Poor | 0.001 |
| H - Potassium perfluoroalkyl sulfonates[8] | Poor | 0.001 |
| I - Potassium fluorinated alkyl carboxylates[9] | Poor | 0.001 |
| J - Fluorinated alkyl quaternary ammonium iodide[10] | Poor | 0.001 |
| K - Fluorinated alkyl polyoxyethylene ethanols[11] | Good | 0.001 + 0.002 |
| L - Fluorinated alkyl esters[12] | Poor | 0.001 + 0.002 |
| Fluorobenzene | Poor | 0.005 |
| Perfluoro-n-butanol | Poor | 0.005 |
| Perfluoro-n-octane | Poor | 0.005 |
| Perfluoro biphenyl | Poor | 0.005 |

[7]"Fluorad" FC-95 *
[8]"Fluorad" FC-98 *
[9]"Fluorad" FC-128 *
[10]"Fluorad" FC-134 *
[11]"Fluorad" FC-170 *
[12]"Fluorad" FC-430 *
*Available from 3M Company
**part per hundred parts of PVC resin Heat stability tests were run on two commercial grades of polyvinyl chloride containing "Monfluor" 31 and "Fluorad" 170. The "Monfluor" 31-containing composition contained 0.005 part per hundred parts resin. The "Fluorad" 170-containing compositions contained 0.001 and 0.005 part per hundred parts resin. The compositions showed no deleterious effects due to the presence of these antistatic agents.

Thus, having described the invention in detail, it will be understood by those skilled in the art that certain variations and modifications may be made without departing from the spirit and scope of the invention as defined herein and in the appended claims.

I claim:

1. An improvement in the method of providing antistatic properties in polyvinyl chloride by chemical treatment the improvement comprising adding to the polyvinyl chloride an effective amount, in the range of about 0.0002 to about 0.02 weight percent based on said polyvinyl chloride, of a fluorocarbon surfactant selected from the group consisting of:

(a) fluorinated alkyl polyoxyethylene ethanols represented by the formula

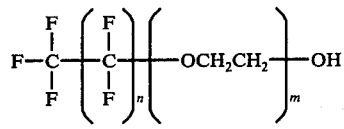

wherein $n$ is in the range of 8 to 18 and $m$ is in the range of 1 to 5, and (b) a compound represented by the formula

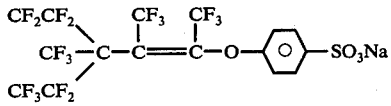

2. The method of claim 1 wherein the amount of fluorocarbon surfactant is in the range of about 0.0005 to about 0.005 weight percent.

3. The method of claim 2 wherein the fluorocarbon surfactant is a fluorinated alkyl polyoxyethylene ethanol.

4. The method of claim 3 wherein the fluorinated alkyl polyoxyethylene ethanol is represented by the formula

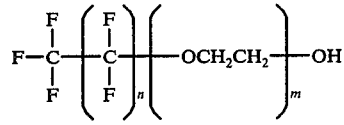

wherein $n$ is in the range of 12 to 14 and $m$ is in the range of 2 to 3.

5. The method of claim 2 wherein the fluorocarbon surfactant is a compound represented by the formula

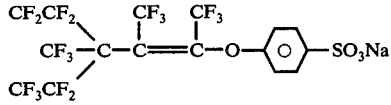

* * * * *